(12) United States Patent
Wada et al.

(10) Patent No.: US 6,795,970 B2
(45) Date of Patent: Sep. 21, 2004

(54) DISK LOADING APPARATUS WITH FLOATABLE CLAMP MEANS

(75) Inventors: Shinichi Wada, Onsen-gun (JP); Yoshinori Takada, Onsen-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 296 days.

(21) Appl. No.: 10/031,019

(22) PCT Filed: Jun. 4, 2001

(86) PCT No.: PCT/JP01/04709

§ 371 (c)(1),
(2), (4) Date: Jan. 14, 2002

(87) PCT Pub. No.: WO01/95322

PCT Pub. Date: Dec. 13, 2001

(65) Prior Publication Data

US 2003/0007441 A1 Jan. 9, 2003

(30) Foreign Application Priority Data

Jun. 7, 2000 (JP) ........................................ 2000-170959

(51) Int. Cl.$^7$ ........................... G11B 7/08; G11B 7/085; G11B 7/09; G11B 17/028; G11B 17/03; G11B 19/20

(52) U.S. Cl. ........................ 720/659; 720/695; 720/667

(58) Field of Search ................................ 369/77.1, 75.1, 369/176, 244, 249, 258, 264, 30.94, 30.95, 30.97, 30.32, 270, 271, 77.11, 75.11, 244.1, 249.1, 258.1, 270.1, 271.1; 360/99.06; 720/600, 617, 619, 621, 624, 658, 659, 663, 706, 661, 667, 695

(56) References Cited

U.S. PATENT DOCUMENTS 6,667,942 B2 * 12/2003 Maeda ..................... 369/77.21

FOREIGN PATENT DOCUMENTS

| JP | 3-124349 U | * | 12/1991 |
| JP | 2000-090526 A | * | 3/1995 |
| JP | 7-244908 A | * | 9/1995 |
| JP | Hei 10-116458 | | 5/1998 |
| JP | 10-241248 A | * | 9/1998 |
| JP | 10-340510 A | * | 12/1998 |
| JP | 11-238278 A | * | 8/1999 |

* cited by examiner

Primary Examiner—Julie Anne Watko
(74) Attorney, Agent, or Firm—Sheridan Ross PC

(57) ABSTRACT

In a disk loading apparatus according to the present invention, a clamp section is configured so as to be floatable in a direction perpendicular to the direction of disk insertion and so as to be lifted up and thereby go outside the path of disk insertion when being confronted with the inserted disk, while a traverse unit of a pickup is configured so as to position a turntable in the replay waiting position and the replay position by the rotational motion.

21 Claims, 4 Drawing Sheets

DISK LOADING APPARATUS WITH FLOATABLE CLAMP MEANS

TECHNICAL FIELD

The present invention relates to a disk loading apparatus capable of recording on or reproducing from a disk-shaped recording medium (simply referred to as a disk, hereafter) such as a CD and a DVD.

BACKGROUND ART

FIGS. 7 and 8 are side cross sectional views of conventional disk loading apparatus. FIG. 7 shows the go situation in which a disk 1 is in a state on the way of being inserted into the conventional disk loading apparatus. FIG. 8 shows the situation in which the disk 1 is clamped in the conventional disk loading apparatus.

As shown in FIG. 7, in the conventional disk loading apparatus, the disk 1 inserted to the apparatus is drawn into the inside of the apparatus by the rotational motion of a roller 18. The roller 18 is provided with a coiled spring 21 serving as enforcing means for causing the roller to push the bottom surface of the disk 1. The disk 1 drawn into the inside of the apparatus is positioned on a turntable 19, and then clamped rotatably by a clamp 16. The turntable 19 is linked directly to the rotary shaft of a spindle motor 30, thereby rotating the clamped disk 1 at a desired speed.

The clamp 16 for retaining the disk 1 is retained by a clamp holder 17, and the clamp holder 17 is configured so as to rotate by a predetermined angle around a rotary center shaft 20. When the disk 1 is inserted to or ejected from the apparatus, the clamp 16 is lifted up by the rotational motion of the clamp holder 17, whereby the clamped state of the disk 1 is released. Also in the ejection of the disk 1, the roller 18 pushes the bottom surface of the disk 1, thereby moving the disk 1 in a direction of the ejection.

In the conventional disk loading apparatus having the above-mentioned configuration, when the disk 1 is inserted, the clamp holder 17 rotates around the rotary center shaft 20 serving as the fulcrum, thereby lifting up the clamp 16, whereby the inserted disk 1 is drawn in by the rotational motion of the roller 18 and then positioned above the turntable 19. When the disk 1 is positioned above the turntable 19, the disk 1 is clamped by the clamp holder 17 and the roller 18, and then pushed down as a whole body onto the turntable 19. The disk 1 placed on the turntable 19 is clamped by the clamp 16 pushed down by the clamp holder 17. After the disk 1 is clamped onto the turntable 19, the roller 18 and the clamp holder 17 move departing from the disk 1, thereby being positioned with a gap from the disk 1.

Further, Japanese Laid-Open Patent Publication No. Hei 11-238278 discloses a disk loading apparatus in which a disk is placed on a disk tray and then loaded. In the conventional disk loading apparatus disclosed in Japanese Laid-Open Patent Publication No. Hei 11-238278, in order for the disk to be prevented from contacting with the other members when the disk placed on the disk tray is inserted to the inside of the apparatus, a clamp is removed from a turntable by magnetic attracting means in the unloading state. In the loading state, the clamp is attracted to the turntable side by another magnetic attracting means, and the disk on the turntable is retained by a centering mechanism provided in the clamp. According to this configuration, in the conventional disk loading apparatus, a rather wide gap is provided between the clamp and the turntable in the unloading state, whereby the contact with the disk has been prevented.

In the conventional disk loading apparatus, in order for the disk 1 to be securely prevented from contacting with the clamp 16, the turntable 19, and the like when the disk 1 is drawn In or ejected, it has been necessary to provide a gap a (see FIG. 7) serving as a large space between the turntable 19 and the clamp 16. In such a disk loading apparatus, reduction of the size and the thickness of the apparatus is an object to be achieved in this technical field. Nevertheless, in the conventional disk loading apparatus, the necessity of a large space between the turntable 19 and the clamp 16 has caused a large problem in reduction of the size and the thickness of the apparatus. Further, the centering mechanism provided in the clamp section by means of a plurality of magnetic attracting means has caused a difficulty in reduction of the size and the thickness of the apparatus.

The invention has been devised in order to resolve the above-mentioned problems, and an object of the invention is to obtain a disk loading apparatus in which reduction of the size and the thickness of the apparatus is achieved, and in which an inserted disk is clamped stably and securely, whereby damage in the recording surface of the disk is prevented and hence high reliability is obtained.

DISCLOSURE OF INVENTION

A disk loading apparatus according to the present invention comprises:

disk transferring means for drawing and ejecting an inserted disk to and from the inside of the apparatus;

clamp means configured so as to be floatable in a direction perpendicular to the direction of disk insertion and configured so as to go outside the path of disk insertion when being confronted with the inserted disk;

turntable means on which the inserted disk is placed and which is driven by a spindle motor;

information reading means for reading the information on the inserted disk; and traverse means configured so as to move the information reading means in the direction of a disk diameter and so as to move said turntable means and cause it to press said clamp means.

The disk loading apparatus having the above-mentioned configuration according to the invention can realize the reduction of the size and the thickness.

In a disk loading apparatus according to another aspect of the present invention, said traverse means is a traverse unit, which is configured so as to rotate around a rotary shaft provided in the vicinity of the outer periphery of the loaded disk and cause said turntable means to move between a replay waiting position and a replay position.

The disk loading apparatus having the above-mentioned configuration according to the invention can realize the reduction of the size and the thickness, and further clamp the inserted disk stably and securely in the apparatus.

In the configuration of a disk loading apparatus according to another aspect of the invention, said disk transferring means comprises a roller which rotates with pushing the inserted disk and thereby performs the drawing-in action and the ejection action of the disk, whereby when the disk is positioned in the replay position, said turntable means is lifted up toward said clamp means, thereby clamping the disk.

The disk loading apparatus having the above-mentioned configuration according to the invention can realize the reduction of the size and the thickness, and further prevent damage in the recording surface of the disk.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 2 is a side view of the main part of a disk loading apparatus according to Embodiment 1 of the present invention in a state on the way of disk drawing-in.

FIG. 4 is a cross sectional view of the main part of the clamp section of a disk loading apparatus according to Embodiment 1 of the present invention in a state on the way of disk drawing-in.

FIG. 7 is the side cross sectional view of the main part of the conventional disk loading apparatus in a state on the way of disk drawing-in.

It will be recognized that some or all of the Figures are schematic representations for purposes of illustration and do not necessarily depict the actual relative sizes or locations of the elements shown.

BEST MODE FOR CARRYING OUT THE INVENTION

Preferred embodiments of a disk loading apparatus according to the present invention are described below with reference to the attached drawings.

Embodiment 1

Figure 1:
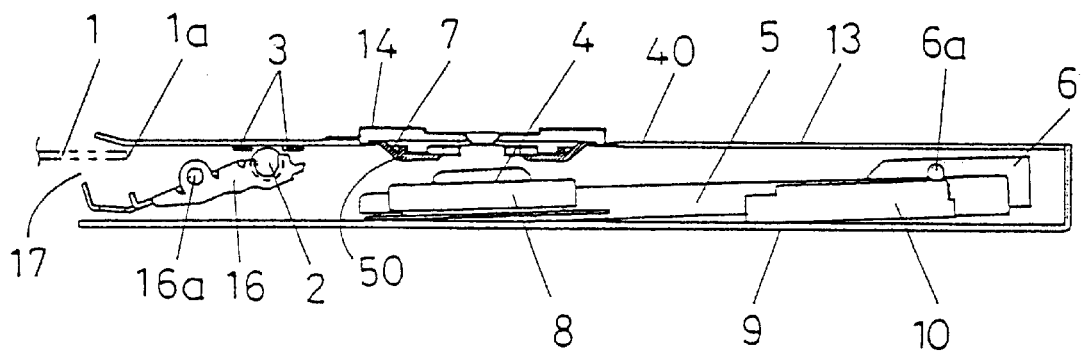
FIG. 1 is a side view of the main part of a disk loading apparatus according to Embodiment 1 of the present invention in the disk waiting state.
Figure 2:
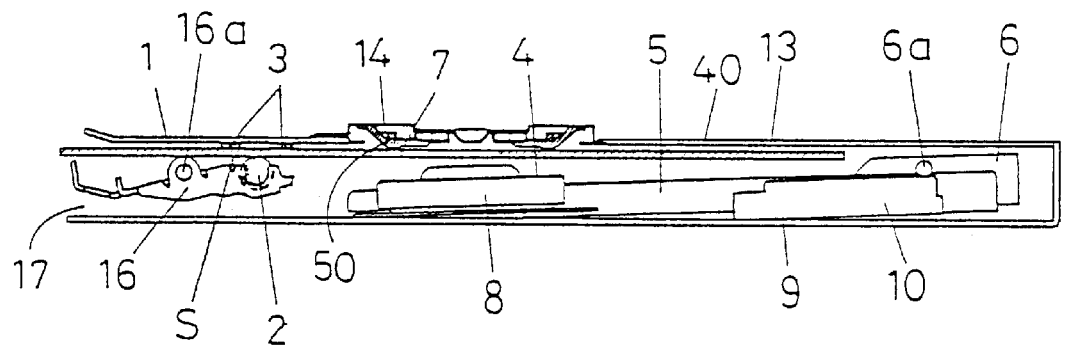
Figure 3:
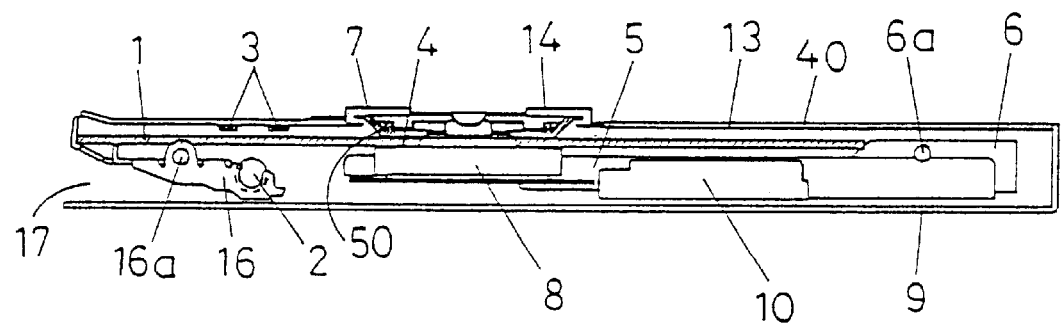
FIG. 3 is a side view of the main part of a disk loading apparatus according to Embodiment 1 of the present invention in the clamped state.

FIG. 1 through FIG. 3 are side cross sectional views showing the main part of a disk loading apparatus according to Embodiment 1 of the present invention; FIG. 1 shows the disk waiting state; FIG. 2 shows a state on the way of a disk being inserted; and FIG. 3 shows the state in which a disk is clamped.

In the disk loading apparatus according to Embodiment 1, a replaying mechanism for replaying the loaded disk 1 is provided inside a frame 40 composed of a bottom cover 9 and a top cover 13. The top cover 13 is provided with a clamp cover 14, in the inside of which a clamp section 50 is disposed for retaining a disk holder 7 movable up and down. Inside the frame 40, a turntable 4 driven by a spindle motor 8 is provided in the position opposed to the disk holder 7. Inside the frame 40, further provided are a pickup 10 for reading the information on the loaded disk 1 and a traverse unit 5 for moving the pickup 10 in the diameter direction of a disk 1. The traverse unit 5 is retained by a traverse chassis 6, and is configured so as to rotate by a predetermined angle around a shaft 6a. According to the rotational motion of the traverse unit 5, the turntable 4 moves between the disk waiting state and the clamped state of the disk 1.

As shown in FIG. 1, in the disk loading apparatus according to Embodiment 1, an opening section 17 is formed in the left side of the frame 40 composed of the bottom cover 9 and the top cover 13, while the opening section 17 is provided with a disk feeder 16. The disk feeder 16 comprises a roller 2 capable of rotating and is configured so as to be rotatable around a shaft 16a.

Described below is the operation of the disk loading apparatus having the above-mentioned configuration according to Embodiment 1. FIG. 1 shows the disk waiting state before the disk 1 is drawn into the apparatus, FIG. 2 shows a state on the way of the disk 1 being drawn in, and FIG. 3 shows the state in which the disk 1 is clamped.

Starting from the disk waiting state shown in FIG. 1, the disk 1 is drawn in; when the tip 1a thereof reaches a predetermined position (the position indicated by reference numeral S in FIG. 2), the roller 2 begins to rotate, whereby the disk feeder 16 rotates (rotates by a predetermined angle in the clockwise direction in FIG. 1) thereby to push the disk 1. By the rotation of the roller 2, with being pressed against a pad 3, the disk 1 is moved toward the turntable 4, whereby the disk 1 is transferred to the position (replay position) in which the center thereof substantially aligns with the center of the turntable 4.

When the disk 1 reaches the predetermined position as described above, an electric signal is input to a driving mechanism, whereby the driving mechanism causes the traverse unit 5 to rotate around the shaft 6a of the traverse chassis 6. As a result, the turntable 4 moves in the direction causing the disk 1 to be pressed, and is thereby enforced toward the disk holder 7. Here, the start of operation of the driving mechanism may be carried out by mechanical linkage action of a lever and a cam caused by the insertion of the disk 1, in place of the above-mentioned electric signal.

As shown in FIGS. 1 and 2, when the traverse unit 5 is in the bottom position, that is, in the disk waiting state or in a state on the way of disk drawing-in, the spindle motor 8 is positioned so as not to contact with the bottom cover 9, while the traverse unit 5 is formed in a thin shape so as to be able to move up and down by a predetermined distance. Further, after the replay of the disk 1, even when the traverse unit 5 rotates around the shaft 6a of the traverse chassis 6 and goes down departing from the disk 1, the spindle motor 8 is configured so as not to contact with the bottom cover 9.

In Embodiment 1, when the turntable 4 is in the bottom position, that is, in the disk waiting state or in a state on the way of disk drawing-in, the pickup 10 is moved in the direction of the outer circumference of the disk 1 and positioned in the vicinity of the shaft 6a so as not to contact with the bottom cover 9. Further, in the ejection of the disk 1, before the traverse unit 5 goes down in order to release the clamping of the disk 1, the pickup 10 is configured so as to be moved in the direction of the outer circumference of the disk 1 so as not to contact with the bottom cover 9.

As described above, in Embodiment 1, the clamp section 50 is configured so as not to rotate, while the traverse unit 5 for retaining the turntable 4 is configured so as to rotate around the shaft 6a of the traverse chassis 6 and thereby move up and down. Further, when the turntable 4 is in the bottom position, the pickup 10 is configured so as to be moved in the direction of the outer circumference of the disk. Therefore, in Embodiment 1, even in case that a pickup 10 and a traverse unit 5 having a shape according to the prior art are used, thickness reduction of the disk loading apparatus can be achieved. In other words, thickness reduction of the disk loading apparatus does not need thickness reduction of the pickup 10 and the traverse unit 5.

Further, in the configuration of Embodiment 1, a disk tray onto which the disk 1 is placed when the disk 1 is inserted is not used. Accordingly, the disk retaining mechanism in embodiment 1 can be configured to be thin, and this permits further thickness reduction of the disk loading apparatus.

Described below is the clamp section of the disk loading apparatus according to Embodiment 1 of the present invention.

Figure 4:
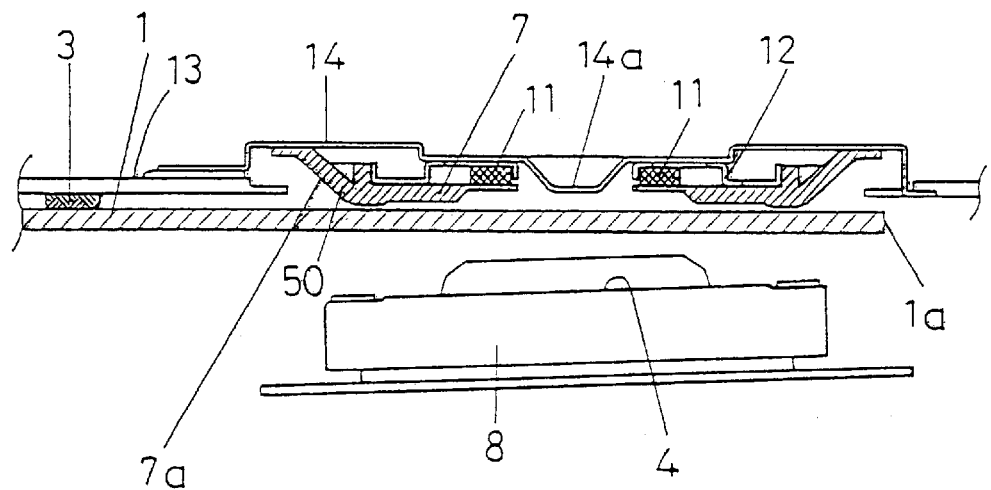
Figure 5:
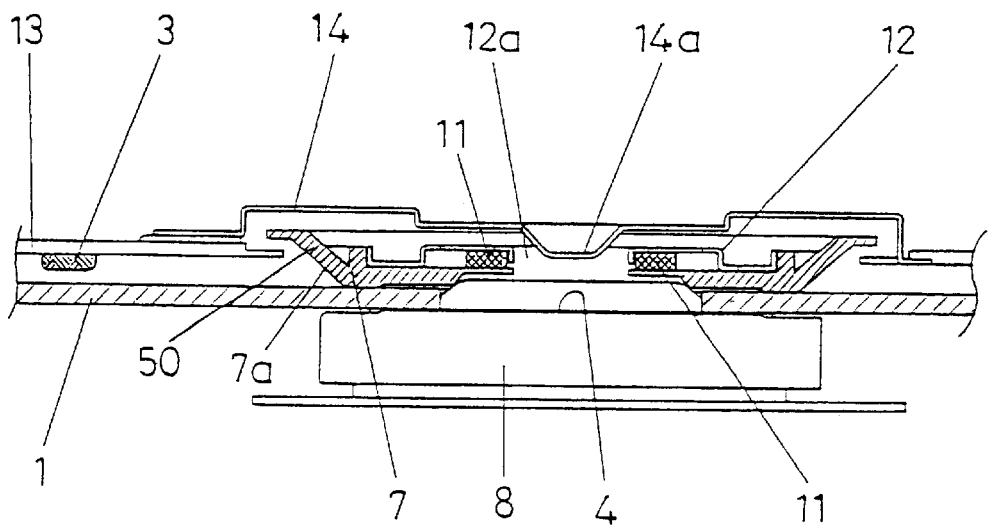
FIG. 5 is a cross sectional view of the main part of the clamp section of a disk loading apparatus according to Embodiment 1 of the present invention in the clamped state.

FIGS. 4 and 5 are cross sectional views of the main part of the clamp section 50 of the disk loading apparatus according to Embodiment 1. FIG. 4 shows a state on the way of the disk 1 being drawn in, while FIG. 5 shows the state in which the disk 1 is clamped.

In FIG. 4, the clamp section 50 according to Embodiment 1 comprises a disk holder 7, a magnet 11, and a magnet yoke 12. The magnet 11 and the magnet yoke 12 are formed in an annular shape, while the magnet 11 is disposed within the magnet yoke 12 concentrically with the disk holder 7 and fixed by claw members and the like provided in the disk holder 7.

Here, in Embodiment 1, the description has been made for the case that the magnet 11 and the magnet yoke 12 are formed in an annular shape, however, the present invention is not restricted to this configuration; the magnet and the magnet yoke may have another shape, for example, a plurality of magnet pieces may be disposed radially from the center of the disk holder 7. Such a configuration permits further weight reduction of the clamp section 50.

The clamp retaining mechanism for retaining the clamp section 50 of the disk loading apparatus according to Embodiment 1 is described below with reference to FIG. 5. The disk holder 7 to which the magnet yoke 12 and the magnet 11 are attached is retained by the clamp cover 14 serving as a clamp retaining member, so as to have a predetermined clearance in the up, down, right, and left directions and so as to be rotatable as well as floatable in the up and down directions. The clamp cover 14 is fixed to the top cover 13, and the clamp cover 14 has a guide 14a for engaging with the center hole 12a of the magnet yoke 12 when the clamp section 50 is confronted with the disk holder 7 and thereby pushed up in the time of insertion of the disk 1. The guide 14a is provided so as to protrude in the direction opposed to the clamp section 50, and arranged so that the center position of the guide 14a substantially aligns with the center position of the turntable 4.

In the normal state, the clamp section 50 is attracted to the clamp cover 14 and lifted up by the magnet 11. Nevertheless, in some cases, for example, in case of a shock during the transfer, the clamp section 50 goes down to the turntable 4 side according to the self-weight. In this case, when the disk 1 is drawn in, the tip 1a which is the end surface of the disk 1 is confronted with the tapered section 7a of the disk holder 7, whereby the disk holder 7 is pushed up. The tapered section 7a of the disk holder 7 is formed so as to have an angle of 45 degrees or less relative to the recording surface of the inserted disk 1.

The clamp section 50 pushed up by the confrontation between the disk 1 and the tapered section 7a is attracted to the clamp cover 14 composed of a magnetic material by the attractive force of the magnet 11. At that time, the ridge of the guide 14a of the clamp cover 14 protrudes into the center hole 12a of the magnet yoke 12, whereby the disk holder 7 is centered at the turntable 4. As such, when the disk 1 is positioned to a predetermined position on the turntable 4, the clamp section 50 goes down to the turntable 4 side according to the self-weight and the attractive force of the magnet 11, thereby being attracted to the turntable 4, whereby stable chucking action of the disk 1 is achieved.

As described above, in the disk loading apparatus according to Embodiment 1, a clamp holder having been provided so as to rotate in the conventional apparatus is not used, and instead, fixed-type clamp means having a clamp section 50 floating up and down is provided. In the disk loading apparatus according to Embodiment 1, the turntable 4 opposed to the clamp means is configured so as to move up and down according to the rotational motion of the traverse unit 5. The traverse unit 5 is configured so as to rotate around the shaft in the position opposite to the position of the turntable 4, that is, in the vicinity of the periphery of the loaded disk 1. In the disk loading apparatus having the configuration according to Embodiment 1, in the drawing-in and the ejection of the disk 1, the traverse unit 5 is configured so as to rotate and thereby cause the turntable provided with the spindle motor 8 to move up and down, whereby the transition between the disk waiting state and the replaying state is carried out.

In Embodiment 1, the thickness of the spindle motor 8 is formed to be thin so that the traverse unit 5 can move up and down within the frame 40, while the pickup serving as the information reading means is configured so as to be moved in the direction of the disk outer circumference in the traverse unit 5 in the disk drawing-in and the disk ejection.

Further, when the traverse unit 5 rotates and the turntable 4 goes down, the clamp section 50 is normally attracted to the clamp cover 14 and lifted up by the magnet 11 built in the clamp section 50. In some cases, due to a shock during the transfer, the clamp section 50 goes down by the self-weight of the clamp section 50 or by the situation that the magnet 11 is attracted to the yoke (not shown) imbedded in the turntable 4. In this case, the tapered section 7a formed in the clamp section 50 and having an angle of 45 degrees or less is confronted with the disk 1, thereby lifting up the clamp section 50, whereby the magnet 11 is attracted to the clamp cover 14. As a result, the bottom surface of the clamp section 50 is positioned at substantially the same elevation as the bottom surface of the pad 3 or at a slightly higher elevation, whereby the inserted disk 1 is positioned securely at the replay position.

In the disk loading apparatus according to Embodiment 1, by virtue of the above-mentioned configuration, the transfer region of the disk 1 is efficiently used, whereby thickness reduction of the apparatus is achieved.

Further, in the configuration of Embodiment 1, centering action is carried out by inserting the protrusion 14a provided in the clamp cover 14 into the center hole 12a of the clamp section 50, whereby stable and secure chucking action of the disk 1 is achieved.

Here, the description of Embodiment 1 has been made for the case that the hole 12a formed in the center of the clamp section 50 for engaging with the guide 14a of the clamp cover 14 is formed in the magnet yoke 12, however, it may be formed in the disk holder 7. Further, the shape of the guide 14a of the clamp cover 14 may be any shape as long as the clamp section 50 is guided to the predetermined position; in place of a combination of a simple protrusion and a hole, a combination of a protrusion and a recess each having an annular shape may be used.

In Embodiment 1, the disk opposing surface (bottom surface in FIG. 4) of the disk holder 7 attached to the clamp cover 14 is formed with a material such as a plastic material having a low coefficient of friction. Further, when the disk 1 contacts with the disk holder 7, the disk opposing surface is positioned at substantially the same elevation as that from the placement surface of the turntable 4 to the bottom surface of the pad 3. Accordingly, in the drawing-in and the ejection of the disk 1, the force generated by the roller 2 of the disk feeder 16 and enforcing the disk 1 upward causes the disk opposing surface of the disk holder 7 to contact with the top surface of the disk 1, whereby the disk 1 is prevented from contacting with the top cover 13.

As described above, in the disk loading apparatus according to Embodiment 1, the clamp section 50 is floatable and of the fixed type, while the traverse unit 5 is configured so as to move up and down. Thus, according to the disk loading apparatus of Embodiment 1, the clamp section 50 is disposed in the disk transfer path, and the disk transfer space is efficiently used, whereby thickness reduction of the apparatus is achieved. Further, in Embodiment 1, the protrusion 14a formed in the clamp case 14 permits centering of the clamp section 50, whereby the position of the clamp section 50 is stabilized, and the chucking action of the disk 1 is carried out securely.

Embodiment 2

Figure 6:
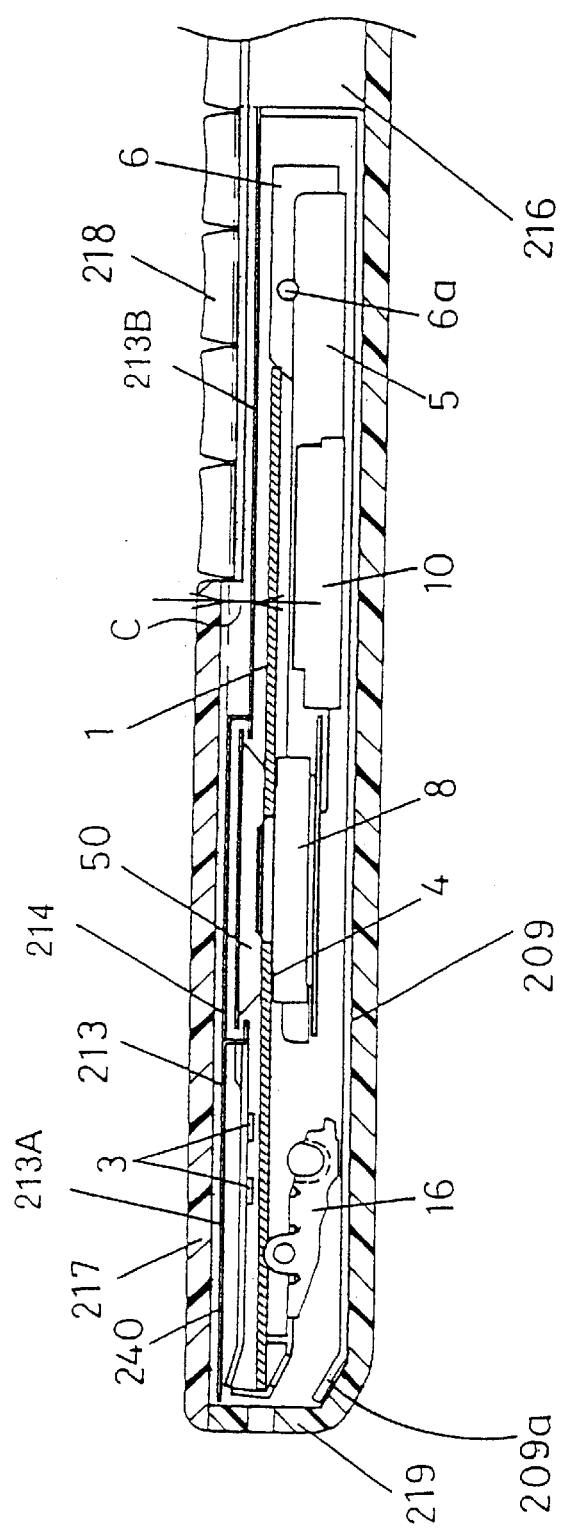
FIG. 6 is a cross sectional view of an example in which a disk loading apparatus according to Embodiment 2 of the present invention is installed in a notebook type personal computer serving as a disk replaying apparatus.
Figure 7:
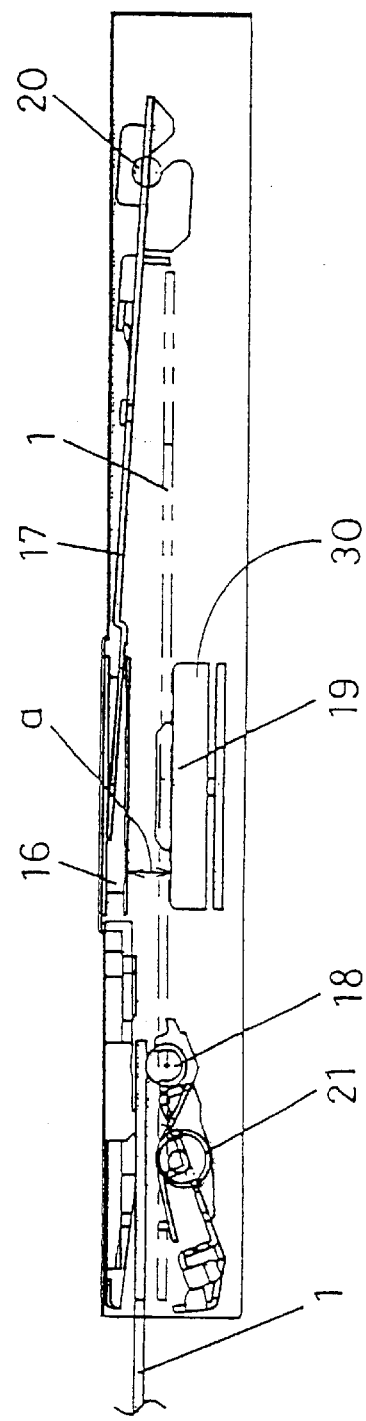
Figure 8:
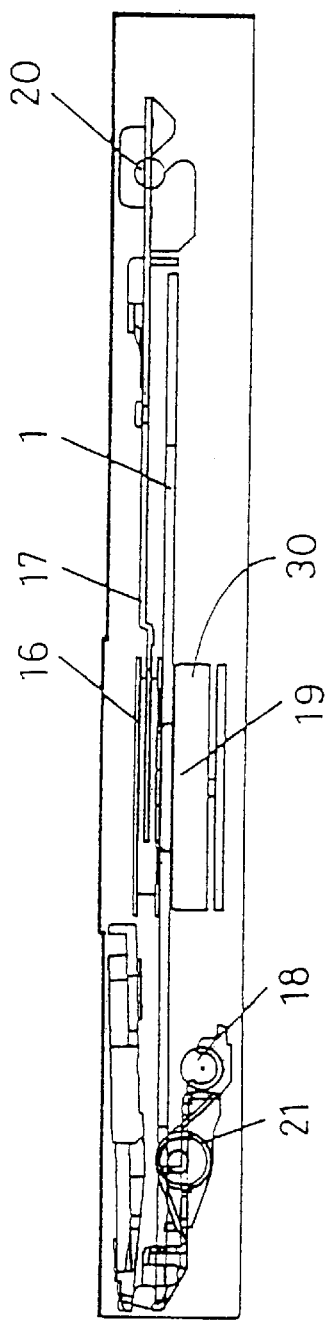
FIG. 8 is the side cross sectional view of the main part of the conventional disk loading apparatus in the clamped state.

Embodiment 2 of a disk loading apparatus according to the present invention is described below with reference to the attached FIG. 6. FIG. 6 is a side cross sectional view of an example in which a disk loading apparatus according to Embodiment 2 of the present invention is installed in a notebook type personal computer 216 serving as a disk replaying apparatus. In FIG. 6, parts having the same function and configuration as those of the above-mentioned disk loading apparatus according to Embodiment 1 are designated by like numerals, and the description is omitted.

As shown in FIG. 6, in the disk loading apparatus according to Embodiment 2, a replaying mechanism for replaying the loaded disk 1 is provided inside a frame 240 composed of a bottom cover 209 and a top cover 213. The top cover 213 is provided with a clamp cover 214, in the inside of which a clamp section 50 movable up and down is provided. Inside the frame, a turntable 4 driven by a spindle motor 8 is provided in the position opposed to the clamp section 50. Inside the frame 240, further provided are a pickup 10 for reading the information on the loaded disk 1 and a traverse unit 5 for moving the pickup 10 in the direction of a disk 1 diameter. The traverse unit 5 is configured so as to rotate by a predetermined angle around a shaft 6a. According to the rotational motion of the traverse unit 5, the turntable 4 moves between the disk waiting state and the clamped state of the disk 1.

FIG. 6 shows an example in which the disk loading apparatus having the above-mentioned configuration is installed in the notebook type personal computer 216 serving as a disk replaying apparatus. In the disk loading apparatus comprising the top cover 213 and the bottom cover 209, a top cover 213A on the disk insertion side is formed at the same elevation as the top surface of the clamp cover 214. On the other hand, a top cover 213B on the traverse unit 5 side is formed at the same elevation as the bottom surface of the clamp cover 214. Therefore, in the disk loading apparatus according to Embodiment 2, the top cover 213 on the traverse unit 5 side (rear section of the apparatus) is formed to be thinner by a dimension C than the top cover 213 on the disk insertion side (front section of the apparatus). A keyboard section 218 of the notebook type personal computer 216 can be disposed in the internal space generated by the elevation difference formed as described above. Further, in the disk loading apparatus according to Embodiment 2, since the top cover 213 on the disk insertion side is formed in a planar shape at the same elevation as the top surface of the clamp cover 214, a palm rest section 217 having a planar shape can be disposed here.

By virtue of the above-mentioned configuration, in the disk loading apparatus according to Embodiment 2, the space in the notebook type personal computer 216 is efficiently used, whereby thickness reduction of the notebook type personal computer 216 is achieved. Further, when a corner surface 209a is formed in the front end section (bottom left surface in FIG. 6) of the bottom cover 209, the degree of freedom in design of the exterior section 219 of the notebook type personal computer 216 is increased.

As seen from the detailed description of the above-mentioned embodiments, the present invention has the following effects.

In the present invention, the clamp section is floatable and of the fixed type, while the turntable opposed to the clamp section is configured so as to cause the traverse unit to rotate by a predetermined angle and thereby move up and down, whereby the clamp section can be disposed in the disk transfer path. Therefore, the present invention provides a disk loading apparatus in which the space inside the apparatus is efficiently used, and in which reduction of the size and the thickness is achieved.

In the disk loading apparatus according to the present invention, the clamp section is guided so as to be positioned securely in the predetermined position. Accordingly, in the disk loading apparatus according to the present invention, the inserted disk is clamped stably and securely, whereby damage in the recording surface of the disk is prevented.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The invention is a disk loading apparatus of high universality applicable to an apparatus, such as a personal computer (PC) of desk-top type and notebook type, for recording on or reproducing from a disk-shaped recording medium such as a CD and a DVD.

What is claimed is:

1. A disk loading apparatus comprising:
   disk transferring means for drawing and ejecting an inserted disk to and from the inside of the apparatus;
   clamp means configured so as to be floatable in a direction perpendicular to the direction of disk insertion and configured so as to keep a distance from a path of disk insertion when being confronted with the inserted disk;
   turntable means on which the inserted disk is placed and which is driven by a spindle motor;
   information reading means for reading the information on the inserted disk; and
   traverse means configured so as to move the information reading means in a diameter direction of a disk and so as to move said turntable means and cause it to press said clamp means,
   wherein when the disk is inserted and ejected, a pickup serving as said information reading means is moved in a direction of the outer circumference of the loaded disk.

2. A disk loading apparatus according to claim 1, wherein said traverse means is a traverse unit, which is configured so as to rotate around a rotary shaft provided in the vicinity of the outer periphery of the loaded disk and cause said turntable means to move between a replay waiting position and a replay position.

3. A disk loading apparatus according to claim 1, wherein said disk transferring means comprises a roller which rotates with pushing the inserted disk and thereby performs the drawing-in action and the ejection action of the disk, whereby when the disk is positioned in a replay position, said turntable means is lifted up toward said clamp means, so as to clamp the disk.

4. A disk loading apparatus according to claim 1, wherein said clamp means comprises: a clamp section having attracting means; and a clamp retaining member for retaining the clamp section rotatably and floatably; wherein when the disk is inserted and said clamp section is pushed up, said clamp section is attracted to the clamp retaining member, and wherein when the disk is positioned in a replay position, said clamp section is attracted to said turntable means, so as to clamp the disk.

5. A disk loading apparatus according to claim 4, wherein a frame enclosing said disk loading apparatus is formed such that the rear section of the apparatus is thinner when the front section of the apparatus on the disk insertion side and the rear section of the apparatus are compared with each other.

6. A disk loading apparatus according to claim 5, wherein said attracting means comprises a magnet, when said clamp retaining member is attracted by said magnet, said clamp section is provided with a guide hole having a recess shape for causing the positioning relative to the center of the rotary shaft of said turntable means, while said clamp retaining member is provided with a guide having a protrusion shape in accordance with said guide hole of said clamp section.

7. A disk loading apparatus comprising:
disk transferring means for drawing and ejecting an inserted disk to and from the inside of the apparatus;
clamp means configured so as to be floatable in a direction perpendicular to the direction of disk insertion and configured so as to keep a distance from a path of disk insertion when being confronted with the inserted disk;
turntable means on which the inserted disk is placed and which is driven by a spindle motor;
information reading means for reading the information on the inserted disk; and
traverse means configured so as to move the information reading means in a diameter direction of a disk and so as to move said turntable means and cause it to press said clamp means, wherein
wherein said clamp means comprises a clamp section having attracting means, and a clamp retaining member for retaining the clamp section rotatably and floatably, wherein when the disk is inserted and said clamp section is pushed up, said clamp section is attracted to the clamp retaining member, and wherein when the disk is positioned in a replay position, said clamp section is attracted to said turntable means, so as to clamp the disk;
when said clamp section is moved departing from said turntable means and pushed up in the time of disk insertion, the position of the bottom surface of said clamp section is positioned at substantially the same elevation as that of a pad with which the inserted disk is confronted and which guides the disk, or alternatively at an elevation having a predetermined distance from the position of said pad in the direction departing from said turntable means.

8. A disk loading apparatus according to claim 7, wherein said traverse means is a traverse unit, which is configured so as to rotate around a rotary shaft provided in the vicinity of the outer periphery of the loaded disk and cause said turntable means to move between a replay waiting position and a replay position.

9. A disk loading apparatus according to claim 7, wherein said disk transferring means comprises a roller which rotates with pushing the inserted disk and thereby performs the drawing-in action and the ejection action of the disk, whereby when the disk is positioned in a replay position, said turntable means is lifted up toward said clamp means, so as to clamp the disk.

10. A disk loading apparatus according to claim 7, wherein when the disk is inserted and ejected, a pickup serving as said information reading means is moved in a direction of the outer circumference of the loaded disk.

11. A disk loading apparatus according to claim 7, wherein said clamp section has a slope confronted with the inserted disk, and wherein when the disk is inserted, said clamp section is moved departing from said turntable means and attracted to said clamp retaining member composed of a magnetic material by a magnet serving as said attracting means.

12. A disk loading apparatus according to claim 7, wherein a frame enclosing said disk loading apparatus is formed such that the rear section of the apparatus is thinner when the front section of the apparatus on the disk insertion side and the rear section of the apparatus are compared with each other.

13. A disk loading apparatus according to claim 12, wherein when said clamp retaining member is attracted by said magnet, said clamp section is provided with a guide hole having a recess shape for causing the positioning relative to the center of the rotary shaft of said turntable means, while said clamp retaining member is provided with a guide having a protrusion shape in accordance with said guide hole of said clamp section.

14. A disk loading apparatus comprising:
disk transferring means for drawing and ejecting an inserted disk to and from the inside of the apparatus;
clamp means configured so as to be floatable in a direction perpendicular to the direction of disk insertion and configured so as to keep a distance from a path of disk insertion when being confronted with the inserted disk;
turntable means on which the inserted disk is placed and which is driven by a spindle motor;
information reading means for reading the information on the inserted disk; and
traverse means configured so as to move the information reading means in a diameter direction of a disk and so as to move said turntable means and cause it to press said clamp means, wherein
said clamp means comprises a clamp section having attracting means, and a clamp retaining member for retaining the clamp section rotatably and floatably, wherein when the disk is inserted and said clamp section is pushed up, said clamp section is attracted to the clamp retaining member, and wherein when the disk is positioned in a replay position, said clamp section is attracted to said turntable means, so as to clamp the disk,
said clamp section has a slope confronted with the inserted disk, and wherein when the disk is inserted, said clamp section is moved departing from said turntable means and attracted to said clamp retaining member composed of a magnetic material by a magnet serving as said attracting means.

15. A disk loading apparatus according to claim 14, wherein said traverse means is a traverse unit, which is configured so as to rotate around a rotary shaft provided in the vicinity of the outer periphery of the loaded disk and cause said turntable means to move between a replay waiting position and a replay position.

16. A disk loading apparatus according to claim 15, wherein said disk transferring means comprises a roller which rotates with pushing the inserted disk and thereby performs the drawing-in action and the ejection action of the disk, whereby when the disk is positioned in a replay position, said turntable means is lifted up toward said clamp means, so as to clamp the disk.

17. A disk loading apparatus according to claim 14, wherein said disk transferring means comprises a roller which rotates with pushing the inserted disk and thereby performs the drawing-in action and the ejection action of the disk, whereby when the disk is positioned in a replay position, said turntable means is lifted up toward said clamp means, so as to clamp the disk.

18. A disk loading apparatus according to claim 14, wherein when the disk is inserted and ejected, a pickup serving as said information reading means is moved in a direction of the outer circumference of the loaded disk.

19. A disk loading apparatus according to claim 14, wherein a frame enclosing said disk loading apparatus is formed such that the rear section of the apparatus is thinner when the front section of the apparatus on the disk insertion side and the rear section of the apparatus are compared with each other.

20. A disk loading apparatus according to claim 19, wherein said attracting means comprises a magnet, when said clamp retaining member is attracted by said magnet, said clamp section is provided with a guide hole having a recess shape for causing the positioning relative to the center of the rotary shaft of said turntable means, while said clamp retaining member is provided with a guide having a protrusion shape in accordance with said guide hole of said clamp section.

21. A disk loading apparatus comprising:

disk transferring means for drawing and ejecting an inserted disk to and from the inside of the apparatus;

clamp means configured so as to be floatable in a direction perpendicular to the direction of disk insertion and configured so as to keep a distance from a path of disk insertion when being confronted with the inserted disk;

turntable means on which the inserted disk is placed and which is driven by a spindle motor;

information reading means for reading the information on the inserted disk; and traverse means configured so as to move the information reading means in a diameter direction of a disk and so as to move said turntable means and cause it to press said clamp means, wherein said disk transferring means comprises a roller which rotates with pushing the inserted disk and thereby performs the drawing-in action and the ejection action of the disk, whereby when the disk is positioned in a replay position, said turntable means is lifted up toward said clamp means, so as to clamp the disk.

* * * * *